United States Patent
Zhang (10) Patent No.: US 8,198,164 B2
(45) Date of Patent: Jun. 12, 2012

(54) LEVEL POSTURE SENSING CHIP AND ITS MANUFACTURING METHOD, LEVEL POSTURE SENSOR

(75) Inventor: Fuxue Zhang, Beijing (CN)

(73) Assignee: Beijing Information Technology Institute, Beijing (CN)

( * ) Notice: Subject to any disclaimer, the term of this patent is extended or adjusted under 35 U.S.C. 154(b) by 0 days.

(21) Appl. No.: 13/089,640

(22) Filed: Apr. 19, 2011

(65) Prior Publication Data

US 2011/0256709 A1    Oct. 20, 2011

Related U.S. Application Data

(62) Division of application No. 12/343,247, filed on Dec. 23, 2008, now Pat. No. 7,950,161.

(30) Foreign Application Priority Data

Jul. 7, 2008  (CN) .......................... 2008 1 0116231

(51) Int. Cl.
  *H01L 21/336* (2006.01)
  *H01L 21/82* (2006.01)
(52) U.S. Cl. ........................................ 438/281; 438/132
(58) Field of Classification Search ........................ None
  See application file for complete search history.

(56) References Cited

U.S. PATENT DOCUMENTS

| | | | |
|---|---|---|---|
| 6,171,880 B1 | 1/2001 | Gaitan et al. | |
| 6,182,509 B1 | 2/2001 | Leung | |
| 6,249,984 B1 | 6/2001 | Barsky et al. | |
| 6,449,857 B1 | 9/2002 | Anikolenko | |
| 6,453,745 B1 | 9/2002 | Jalkanen | |
| 6,516,527 B1 | 2/2003 | Moriyasu | |
| 6,722,199 B2 | 4/2004 | Ploechinger | |
| 7,516,660 B2 | 4/2009 | Kozlov et al. | |

FOREIGN PATENT DOCUMENTS

| | | |
|---|---|---|
| CN | 1970431 | 5/2007 |
| CN | 101071066 | 11/2007 |
| EP | 0 674 182 | 9/1995 |
| GB | 2 449 731 | 12/2008 |
| WO | WO 97/46889 | 12/1997 |

OTHER PUBLICATIONS

International Search Report in Corresponding GB Application No. 0822433.9 (Jan. 30, 2009).
"Research on Sensitive Structure of Gas Pendulum Omni-directional Tilt Sensor," by Yu Lin et al., Electronic Components & Materials, vol. 25, No. 5, May 2006, 4 pages.

*Primary Examiner* — Scott B Geyer
(74) *Attorney, Agent, or Firm* — Brinks Hofer Gilson & Lione (57) ABSTRACT

The present invention discloses a gas pendulum style level posture sensing chip and its manufacturing method and a level posture sensor. The gas pendulum style level posture sensing chip includes: a semiconductor substrate; two sets of arm thermosensitive fuses formed on the surface of the semiconductor substrate, each set of the thermosensitive fuses including two thermosensitive fuses in parallel to each other, the two sets of thermosensitive fuses being vertical to each other; electrodes formed at the two ends of the thermosensitive fuses. For the level posture sensing chip and sensor provided by the present invention, the parallelism and verticality of the thermosensitive fuses is high in precision such that the more accurate measurement can be implemented.

7 Claims, 13 Drawing Sheets

LEVEL POSTURE SENSING CHIP AND ITS MANUFACTURING METHOD, LEVEL POSTURE SENSOR

CROSS REFERENCE TO RELATED APPLICATIONS

The present application is a divisional application of U.S. patent application entitled LEVEL POSTURE SENSING CHIP AND ITS MANUFACTURING METHOD, LEVEL POSTURE SENSOR, application Ser. No. 12/343,247, filed on Dec. 23, 2008, now U.S. Pat. No. 7,950,161 which is hereby incorporated by reference.

TECHNICAL FIELD

This invention relates to the technical field of level posture measuring of a carrier, and particularly, to a level posture sensing chip and its manufacturing method and a micromachined gas pendulum style level posture sensor.

BACKGROUND

The conventional level posture sensor contains a solid pendulum style and a liquid pendulum style. The two pendulum styles level posture sensors both have the disadvantages of a complex structure, a bad anti-impact performance and long responding time and so on to a various degree. A one dimension gas pendulum style level posture sensor using "gas pendulum" instead of "solid pendulum" or "liquid pendulum" is provided in the invention whose application number is 93216480.3 filed by the present applicant with the Chinese Patent Office. This level posture sensing element generally utilizes a single-chamber double-fuses structure where there are two thermosensitive fuses in the hermetic chamber through which constant currents flow. The thermosensitive fuses heat the gas in the chamber as a heat source, and at the same time the thermosensitive fuses are also used as measuring elements, the two thermosensitive fuses composing two arms of a signal detecting bridge. When the one dimension gas pendulum style level posture sensing element is in a horizontal state, the hot airflows generated by the two thermosensitive fuses are both in vertical upward directions, both of them are on an identical isotherm, the resistances of the two thermosensitive fuses are the same, the bridge is in balance, and the output voltage of detecting circuit is 0. When the sensing chamber is inclined an angle degree relatively to horizontal surface, the two thermosensitive fuses are on different isotherms separately, the resistances of the thermosensitive elements vary differently, the resistances of the two thermosensitive fuses are unequal, the bridge is out of balance, and a voltage proportional to the inclination angle is output.

However, the one dimension structure level posture sensing element can only sense level posture in one direction. If a two dimension level posture needs to be measured, two sensors amounted vertically must be used such that the volume is much lager than that of the one dimension; meanwhile the cross coupling of the axes is often larger because of the greater difficulty of the vertical amounting. Moreover, the thermosensitive fuses function both as detecting temperature and as heating at the same time. To ensure that the thermosensitive fuses could have sensitivity high enough and chamber temperature, the current flowing in the thermosensitive fuses is generally large, the temperature of the thermosensitive fuses is high, and the detecting performance of the thermosensitive fuses is reduced such that the stability of the sensor becomes poor.

For the purpose of improving performance and reducing cost and decreasing volume, 13$^{th}$ Institute of CETC issues "Research on reliability of the MEMS convective accelerometer" (Micronanoelectronic Technology, 2003, July-August, pages 317-320) wherein a resistance of a fuse is between 300Ω~1000Ω.

The processes used in "Micromachined Convective Accelerometer" reported by Hebei Semiconductor Research Institute (Chinese Journal of Semiconductors, 2001, Vol. 22, No. 4, pages 465-468) are those: thermally growing a layer of $SiO_2$ on (100) Si, depositing a layer of polysilicon, then photo etching, and boron diffusing the polysilicon to inform resistor strips, and finally depositing a layer of silicon nitride ($SiN_x$) so as to construct a polysilicon thermosensitive resistor and a heat resistor.

SUMMARY OF THE INVENTION

In view of above, the present invention solves a technical problem to provide a gas pendulum style level posture sensing chip with high measurement accuracy.

The gas pendulum style level posture sensing chip provided by the present invention includes: a semiconductor substrate; two sets of arm thermosensitive fuses formed on the surface of the semiconductor substrate, each set of the thermosensitive fuses including two thermosensitive fuses in parallel to each other, the two sets of thermosensitive fuses being vertical to each other; electrodes formed at the two ends of the thermosensitive fuses.

Further, the level posture sensing chip of the present invention also includes: an arm heating fuse formed on the surface of said semiconductor substrate, said heating fuse being disposed along the symmetrical position of the same set of thermosensitive fuses; electrodes formed at the two ends of said heating fuse.

According to an embodiment of the present invention, the two sets of thermosensitive fuses constructs a rectangular and shares a heating fuse disposed on a diagonal of the rectangular.

According to an embodiment of the present invention, each set of the thermosensitive fuses has a heating fuse disposed along the middle position of the same set of the two thermosensitive fuses.

According to an embodiment of the present invention, the semiconductor substrate is a silicon substrate, said thermosensitive fuses and said heating fuse are both mostly composed of Pt. The widths of the thermosensitive fuses and the heating fuse are 40-60 μm, the lengths thereof are 1200-1600 μm, and the spaces between fuses are 500-1000 μm.

Another problem solved by the present invention is to provide a micromachined gas pendulum style level posture sensor.

The micromachined gas pendulum style level posture sensor provided by the present invention includes: a casing, a base, an angular velocity gyroscope, a signal processing circuit, a sensing element including the level posture sensing chip described above. The sensing chip and the angular velocity gyroscope are amounted on the base. The sensing chip outputs a tilt signal to said signal processing circuit, the angular velocity gyroscope outputs an angular velocity signal to said signal processing circuit, said signal processing circuit processes said tilt signal and said angular velocity signal to output a level posture voltage signal.

Another technical problem solved by the present invention is to provide a semiconductor chip manufacturing method.

The semiconductor chip manufacturing method provided by the present invention includes the steps of: forming a mask layer on a surface of a semiconductor substrate; forming thermosensitive fuses and a heating fuse on said mask layer; forming electrodes at the ends of said thermosensitive fuses and said heating fuse; and forming an arm by etching the area of the semiconductor substrate where said thermosensitive fuses and said heating fuse are by combining dry method with wet method.

Further, the step of forming the thermosensitive fuses and the heating fuse on the mask layer described above includes: forming a first pattern on said mask layer by photo etching; and forming the thermosensitive fuses and the heating fuse composed of metal or alloy on said first pattern by sputtering or evaporating.

The step of forming electrodes at the ends of said thermosensitive fuses and said heating fuse includes: forming a second pattern on said surface of the semiconductor by photo etching; and forming the electrodes on said second pattern by evaporating, said electrodes being disposed at the ends of said thermosensitive fuses and said heating fuse.

The step of forming the arm includes: forming a third pattern around said thermosensitive fuses and said heating fuse on the surface of said semiconductor by photo etching; forming thermosensitive fuse cylinders and a heating fuse cylinder by dry method etching; and forming arm thermosensitive fuses and an arm heating fuse by wet method etching.

Furthermore, it also includes the step of: heat-processing said semiconductor chip under the temperature of 300-800° C.

According to the gas pendulum style level posture sensing chip provided by the present invention, by the micromachined processing technique manufacturing, the degree of parallelization and verticality of the thermosensitive fuses is high in precision so as to implement the higher accuracy of measurement.

DETAILED DESCRIPTION OF EMBODIMENTS

The present invention will be described in more details with reference to the drawings below, wherein illustrative embodiments of the present invention are explained.

Figure 1:
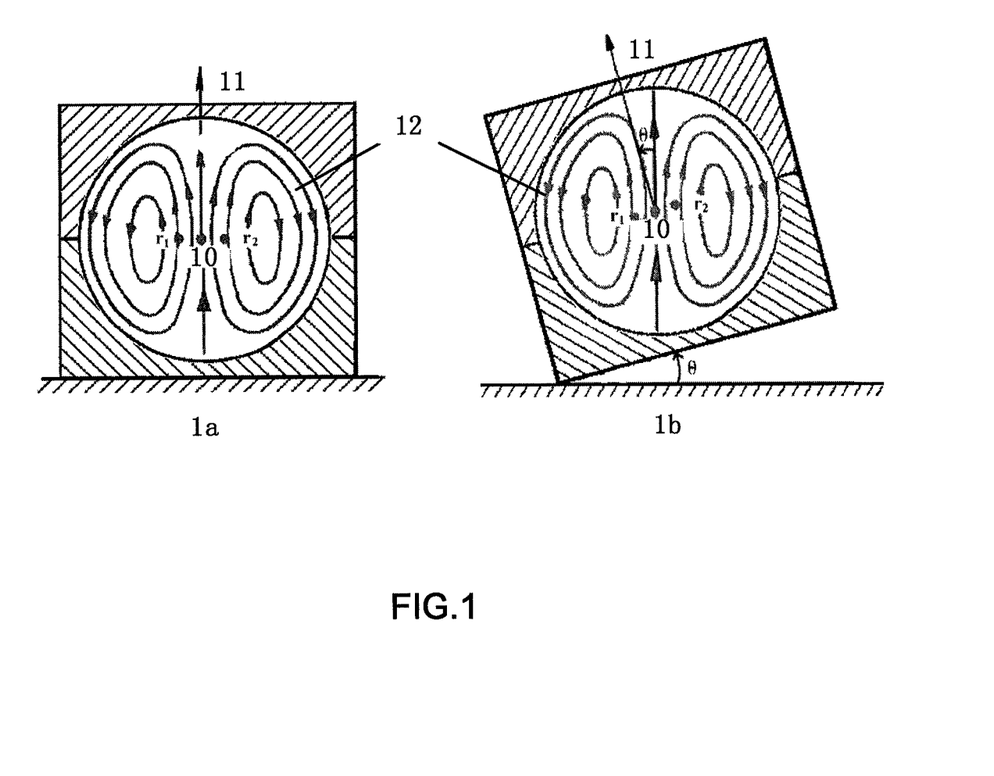
FIG. 1 is a schematic illustrative diagram of operating principle of a micromachined gas pendulum style level posture sensor.

FIG. 1 is a schematic illustrative diagram of operation principle of a micromachined gas pendulum style level posture sensor. Its principle is to utilize the pendulum characteristic of natural convection gas in a hermetic chamber in which two thermosensitive fuses in parallel are disposed as two arms of a bridge. In FIG. 1, 10 indicates a heat source, 11 indicates a normal line of the plane where the thermosensitive fuses are, 12 indicates the direction of gasflow. As shown in FIG. 1a, when the sensor is placed horizontally, the hot gasflow is vertical upward to the plane where the thermosensitive fuses are, where the quantities of heat absorbed by the two thermosensitive fuses are equal, the temperatures are equal, and the bridge achieves balance. As shown in FIG. 1b, when the sensor tilts an angle θ, the hot gasflow remains to keep vertical upward because of the characteristic of pendulum, but departs a tilt θ from the normal line of the plane where the thermosensitive fuses are such that the quantities of heat absorbed by the thermosensitive fuses are different, the temperatures are also different with the result that the bridge is out of balance, and a voltage signal proportional to the tilt is output:

$$V_0 = K\theta \quad (1)$$

K in the equation above is a scale coefficient (mv/°). When the tilt sensing direction is opposite, the symbol of the output voltage is also opposite.

Figure 2:
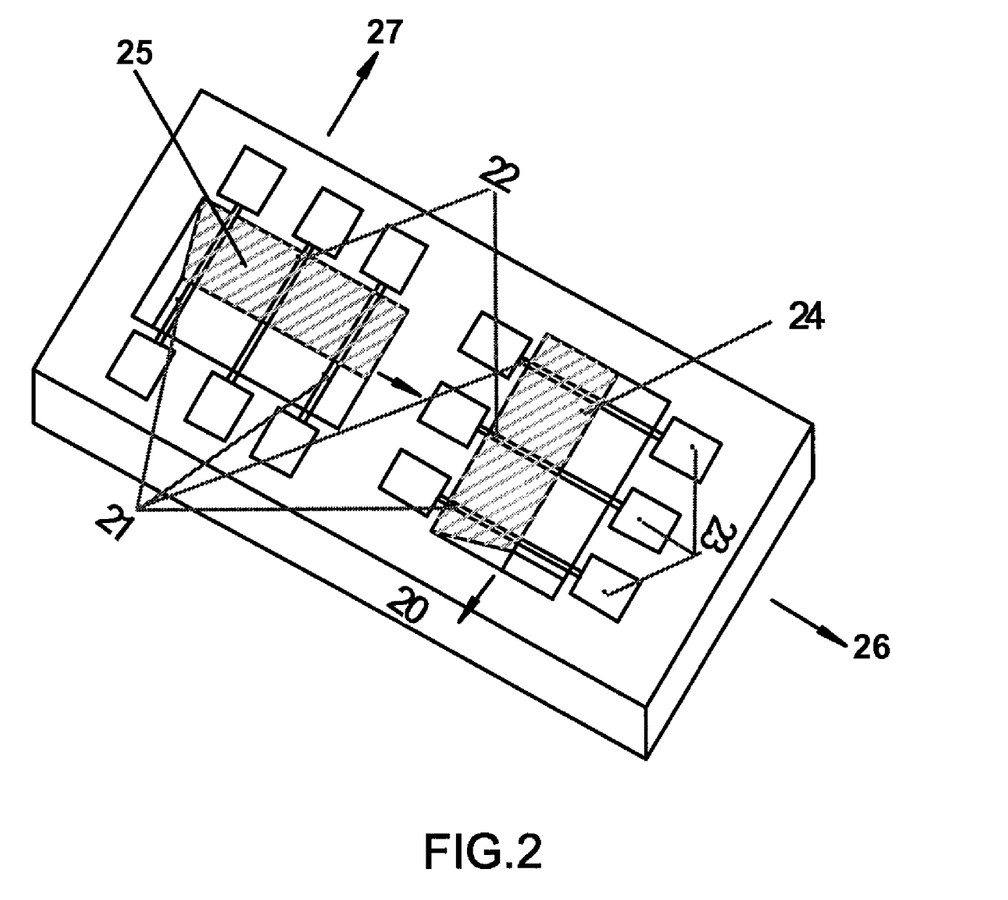
FIG. 2 is a structural illustrative diagram of an embodiment of a gas pendulum style level posture sensing chip according to the present invention.

FIG. 2 is a structural illustrative diagram of an embodiment of a gas pendulum style level posture sensing chip according to the present invention. As shown in FIG. 2, the level posture sensing chip includes a silicon wafer 20 as a substrate, two set of thermosensitive fuses 21 and heating fuse 22 in parallel to each other formed on the silicon wafer 20, electrodes 23 formed at the ends of the thermosensitive fuses and the heating fuse and chambers 24 and 25 formed under each set of the thermosensitive fuses. Arrows 26 and 27 indicate a sensing axis (parallel to the direction of the thermosensitive fuse) of each set of the thermosensitive fuses separately, and tilting a certain positive and negative angle can be done around the axis. The tilt in two directions vertical to each other can be measured by the structure shown in FIG. 2. The thermosensitive fuses and the heating fuse can be mostly composed of platinum (Pt), and thermosensitive resistance material or alloy such as platinum-lawrencium, nickel-chromium-aluminum etc. can be used as well.

According to an embodiment of the present invention, widths of the thermosensitive fuses and the heating fuse are 40-60 μm, lengths thereof are 1200-1600 μm, and spaces between fuses are 500-1000 μm.

Figure 3:
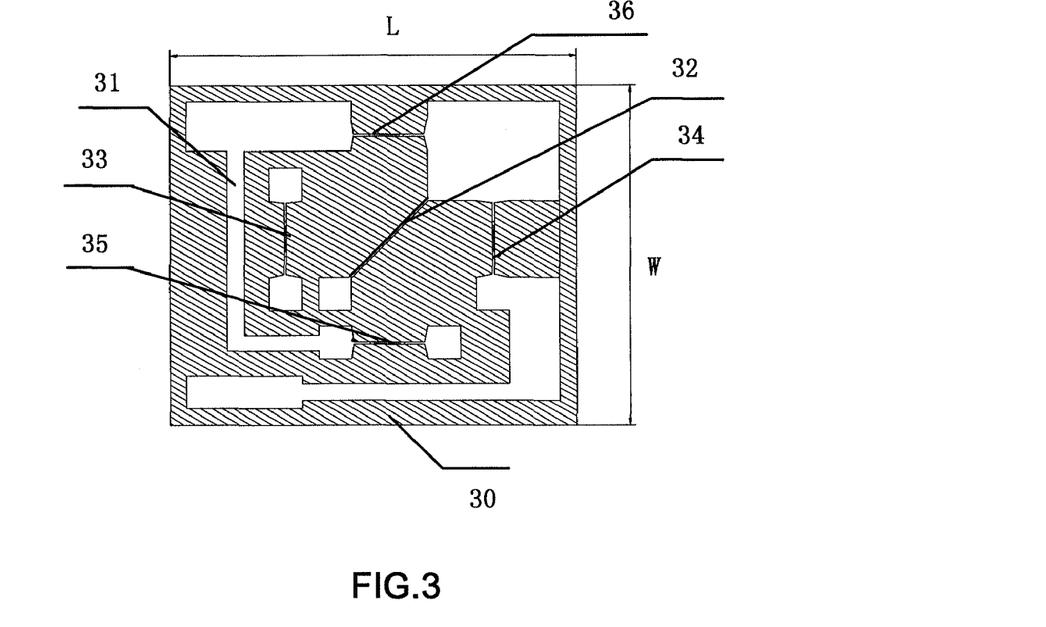
FIG. 3 is a structural illustrative diagram of another embodiment of the level posture sensing chip according to the present invention.

FIG. 3 is a structural illustrative diagram of another embodiment of the level posture sensing chip according to the present invention. In this embodiment, two sets of thermosensitive fuses shares a heating fuse. As shown in FIG. 3, L and W separately indicate the length direction and the width direction of the chip, i.e. X axis and Y axis directions. The level posture sensing chip in the figure includes a substrate 30, an electrode 31 formed on the substrate, a heating fuse 32, thermosensitive fuses 33 and 34 along the width direction of the chip and thermosensitive fuses 35 and 36 along the length direction of the chip. The same set of the thermosensitive fuses are disposed in parallel, and the different set of the thermosensitive fuses are vertical to each other. The two sets of the thermosensitive fuses shares the identical heating fuse 32, and the heating fuse is along the symmetrical position of the thermosensitive fuses. For example, four thermosensitive fuses form a rectangular (for example, a square), and the heating fuse is at the position of the diagonal of the rectangular. The thermosensitive fuses and the heating fuse are formed in arm structures by manufacturing processes, and a chamber under the thermosensitive fuses and the heating fuse is formed in the substrate. The electrode 31 on the substrate can be mostly composed of metal such as gold, silver, copper, aluminum, and etc., and also can be composed of alloy. Besides using silicon, the substrate also can use germanium, selenium, and etc.

Figure 4:
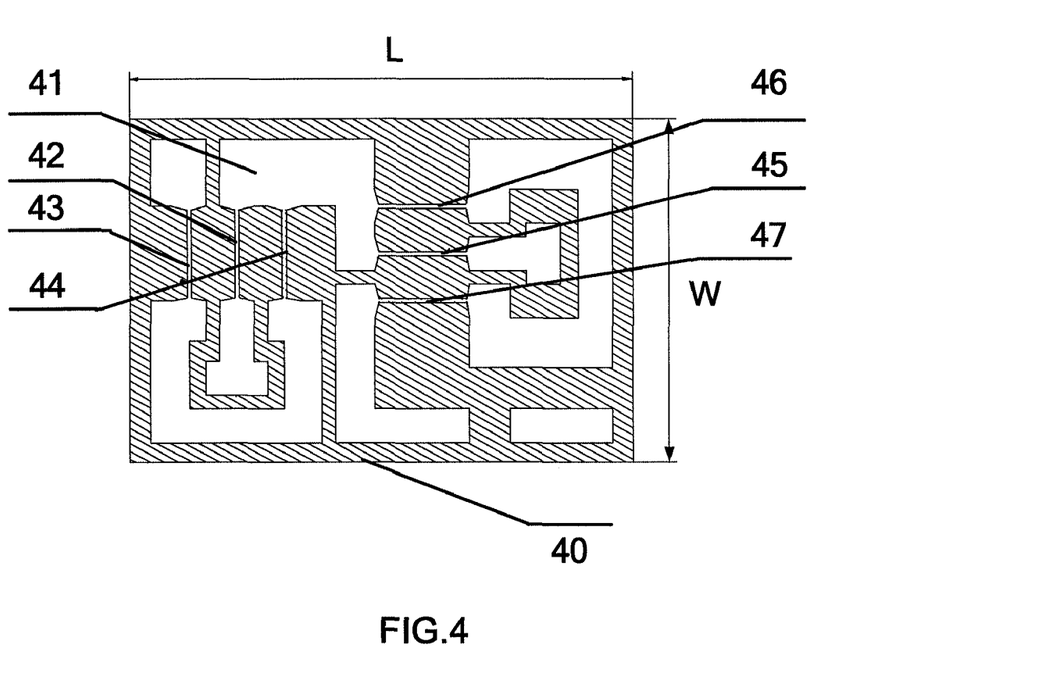
FIG. 4 is a structural illustrative diagram of another embodiment of the level posture sensing chip according to the present invention.

FIG. 4 is a structural illustrative diagram of another embodiment of the level posture sensing chip according to the present invention. As shown in FIG. 4, L and W separately indicate the length direction and the width direction of the chip. The level posture sensing chip in the figure includes a substrate 40, an electrode 41 formed on the substrate, thermosensitive fuses 43 and 44 and a heating fuse 42 along the width direction of the chip and thermosensitive fuses 46 and 47 and a heating fuse 45 along the length direction of the chip. The same set of the thermosensitive fuses and the heating fuse are in parallel to each other, and the different set of the thermosensitive fuses and the heating fuse are vertical to each other. The heating fuse 42 is disposed along the middle position of the thermosensitive fuses 43 and 44, and the heating fuse 45 is disposed along the middle position of the thermosensitive fuses 46 and 47. The thermosensitive fuses and the heating fuse are formed in arm structures by manufacturing processes, and a chamber is formed on the area of substrate where the thermosensitive fuses and the heating fuse are.

Using the heating fuse, output signal can be increased and the stable time can be shortened. If the heating fuse is not used, the signal output of each set of the thermosensitive fuses is small. At the same tilt, the sensitivity level of the output signals in the presence of the heating fuse is increased by 6-8 times than that without the presence of the heating fuse. For the sensor chips in the same space, the stable times of the output voltages are different in the presence of or without the presence of the heating fuse, and the heating fuse can enable the stable time of the output voltage to be shortened.

The thermosensitive fuse resistor R1 and the heating fuse resistor R2 can be expressed as followed:

$$R1 = \rho \frac{L_1}{S_1} \quad (2)$$

$$R2 = \rho \frac{L_2}{S_2} \quad (3)$$

wherein $\rho$ is the resistivity of Pt; $L_1$ and $L_2$ are the lengths of the thermosensitive fuses and the heating fuse separately; $S_1$ and $S_2$ are the cross sectional areas of the thermosensitive fuses and the heating fuse separately. In case that the cross sections of the thermosensitive fuses and the heating fuse are rectangular, $S=W \times H$, that is, the cross sectional area is equal to the product of the length and the width. To compute the required resistance by equation (2) and equation (3), not only the possibility of the micromachining manufacturing and the mechanistic characteristic of the fuse must be considered, but also acquiring the required output signal must be also considered. Therefore, the optimal sizes of the thermosensitive fuses and the heating fuse must be determined by experiment.

The thermosensitive fuses and the heating fuse of Pt are a little slender, and they can be aged for a long time at the voltage higher than an operating voltage to increase its operation stability. Before power-on operation, the chip is heat-processed for 2 h (2 hours) under 300-800° C. to improve the crystal grain arrays of the thermosensitive fuses and the heating fuse so as to increase the operation stability of the chip thereof. Table 1 below shows the experiment result of the two sets of fuses power-on working for 40 h:

TABLE 1

| Power-on working time (h) | Voltage of A set (V) | | | Voltage of B set (V) | | |
|---|---|---|---|---|---|---|
| | heating fuse | thermosensitive fuse 1 | thermosensitive fuse 2 | heating fuse | thermosensitive fuse 1 | thermosensitive fuse 2 |
| 0 | 1.638 | 1.489 | 2.789 | 1.339 | 1.314 | 2.514 |
| 15 | 1.585 | 1.490 | 2.786 | 1.340 | 1.316 | 2.511 |
| 20 | 1.576 | 1.482 | 2.778 | 1.330 | 1.308 | 2.501 |
| 24 | 1.573 | 1.479 | 2.777 | 1.330 | 1.316 | 2.509 |
| 40 | 1.581 | 1.488 | 2.791 | 1.326 | 1.308 | 2.501 |

Seeing from Table 1, after the continuous power-on working for 40 h, the voltage variation in the fuses is <±0.3%, which indicates that the resistance variation is vary small and the stability of the sensor is quite well on condition that the thermosensitive fuses and the heating fuse are at the same work temperature.

In case that chips with a single heating fuse and chips with double heating fuses are respectively placed in an identical casing, and in the same condition, the sensitivity level of the output signal of the chip with the single heating fuse is smaller by about 20-30% than that of the chip with two heating fuses.

Figure 5:
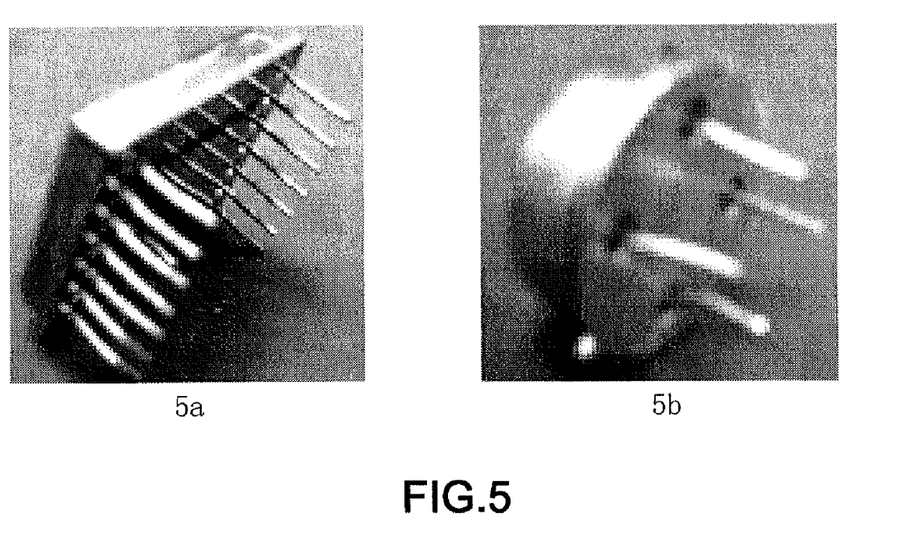
FIG. 5a is an illustrative diagram of a level posture sensing element in a rectangular structure.
FIG. 5b is an illustrative diagram of a level posture sensing element in a semicircular structure.

The level posture sensing chip can be amounted in different chambers. FIG. 5 is an embodiment of the chamber, wherein there is a chamber in a rectangular structure in FIG. 5a, with the inner space size of 2 cm×1.8 cm×0.4 cm, and the volume of 1.44 cm³. In FIG. 5b, there is a chamber in a semicircular structure, with the diameter of the chamber of 0.7 cm, the height of 0.5 cm, and the volume of 0.77 cm³.

Table 2 below shows the experiment result of output signals (tilt)±80° of different chamber structures in the case that the first level amplifying same-kind detecting circuit is used and the heating fuse are at different bias voltages:

TABLE 2

| bias voltage (V) | rectangular structure voltage (mV) | semicircular structure voltage (mV) |
|---|---|---|
| 2.35 | ±110 | ±100 |
| 1.83 | ±90 | ±80 |
| 1.45 | ±60 | ±55 |
| 1.15 | ±35 | ±35 |
| 0.76 | ±20 | ±20 |
| 0.56 | ±15 | ±15 |

Seeing from the data in Table 2, chamber structures with different shapes and different volumes have little effect on the output signals.

Figure 6:
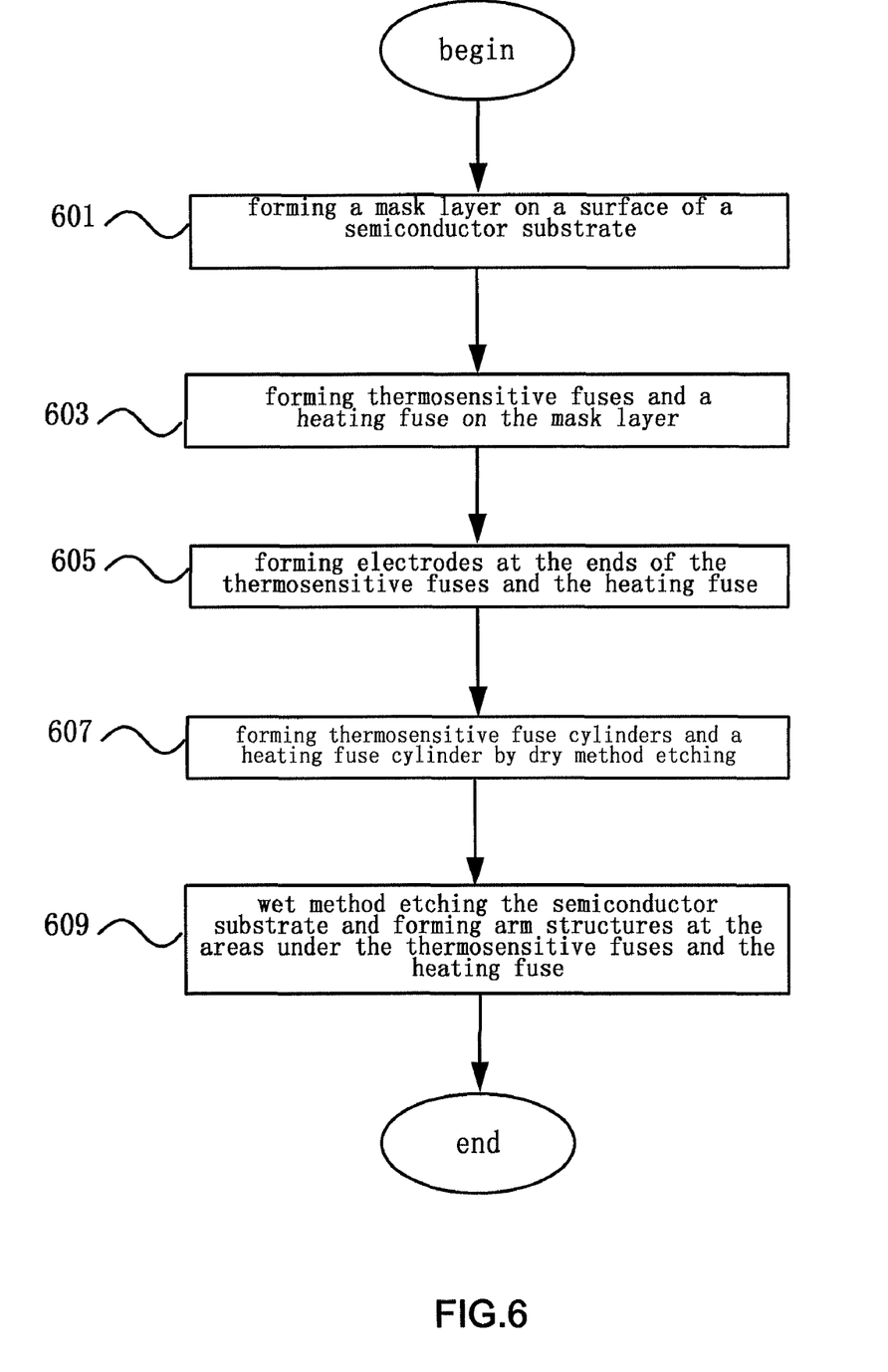
FIG. 6 is a flowchart of an embodiment of a manufacturing method of the gas pendulum style level posture sensing chip according to the present invention.

FIG. 6 is a flowchart of an embodiment of a manufacturing method of the gas pendulum style level posture sensing chip according to the present invention.

As shown in FIG. 6, at step 601, a mask layer is formed on a semiconductor substrate. For example, when the substrate is a (100) silicon wafer, SiO₂ is grown on the surface of the silicon wafer such that a mask can be formed on the surface of the silicon wafer to protect the surface of the silicon wafer and to provide processing conditions for the following processes.

At step 603, thermosensitive fuses and a heating fuse are formed on the mask layer. Using the pattern formed on the mask layer by photo etching, the thermosensitive fuses and the heating fuse are formed by depositing metal (e.g. platinum, etc) or alloy (platinum lawrencium, nickel chromium aluminum, etc) on the mask layer using a sputtering or vaporization process.

At step 605, electrodes are formed at the ends of the thermosensitive fuses and the heating fuse. Using the electrode pattern formed on the surface of the chip by photo etching, and the electrode is formed by sputtering. The sputtering material can be metal, such as gold, silver, copper, aluminum etc, or alloy. The electrode also can be formed by the way of vaporization.

At step 607, thermosensitive fuse cylinders and a heating fuse cylinder are formed by dry method etching.

At step 609, arm structures are formed at the areas of the substrate under the thermosensitive fuses and the heating fuse by wet method etching. After processing of this step, chamber bodies are formed at the areas under the thermosensitive fuses and the heating fuse, and the thermosensitive fuses and the heating fuse form the arm structures.

Figure 7:
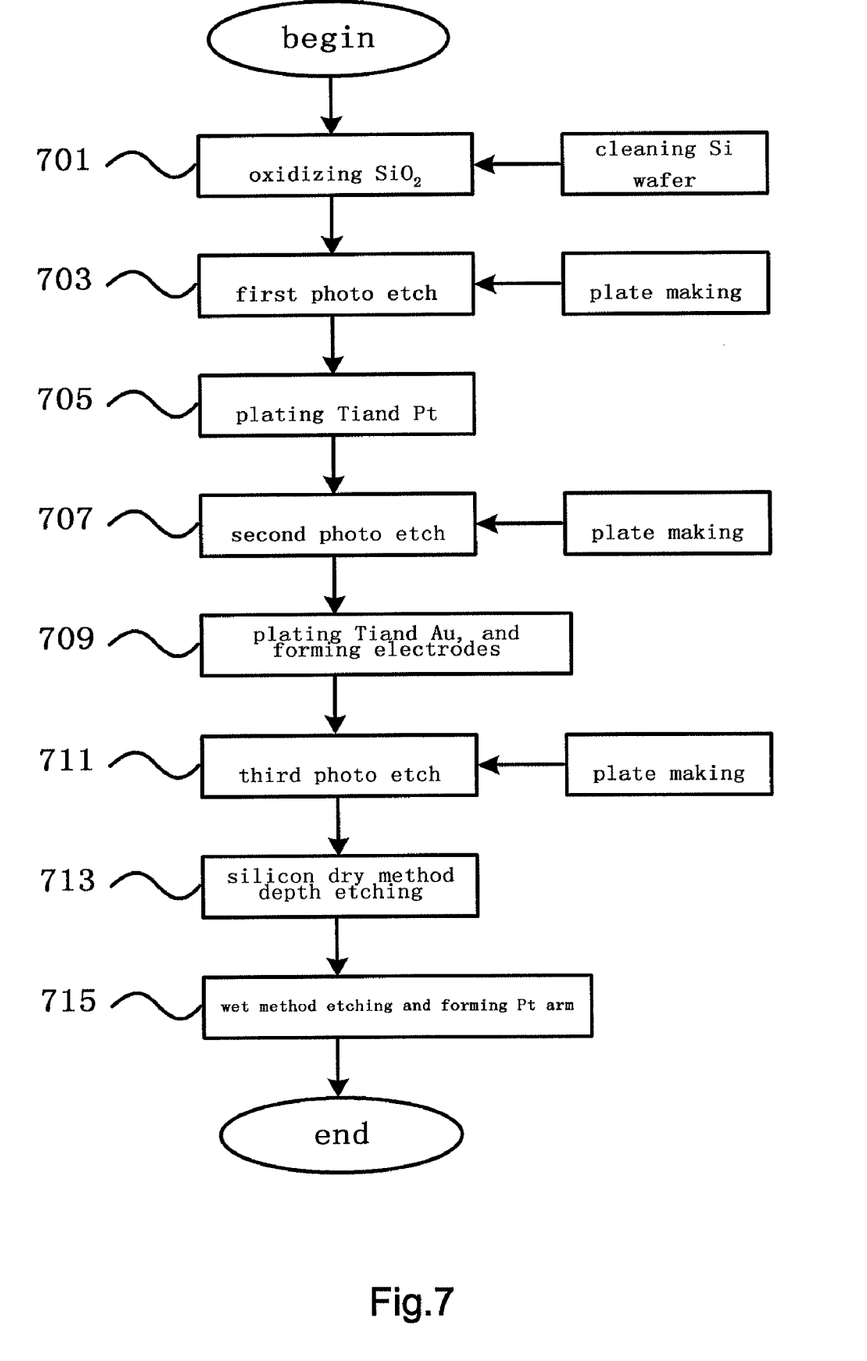
FIG. 7 is a flowchart of another embodiment of the manufacturing method of the level posture sensing chip according to the present invention.

FIG. 7 is a flowchart of another embodiment of the manufacturing method of the level posture sensing chip according to the present invention.

As shown in FIG. 7, at step 701, a silicon dioxide layer is formed on the selected surface of the silicon wafer by oxidation and the silicon wafer can be cleaned before forming the silicon dioxide layer. The cross sections of the oxidized surface of the silicon wafer at (A-A) and (B-B) are shown in FIG. 9(a).

Figure 8A:
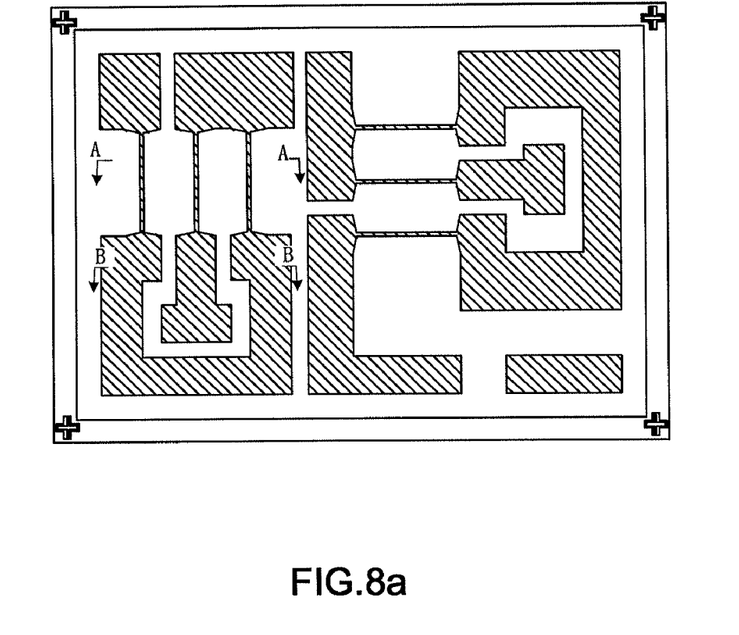
FIG. 8a is an illustrative diagram of a mask board used for first photo etching.

At steps 703 and 705, the surface of the silicon wafer is subject to the first photo etch by using a first mask board shown in FIG. 8a, and at step 705, plating Ti and Pt is finished.

Figure 9:
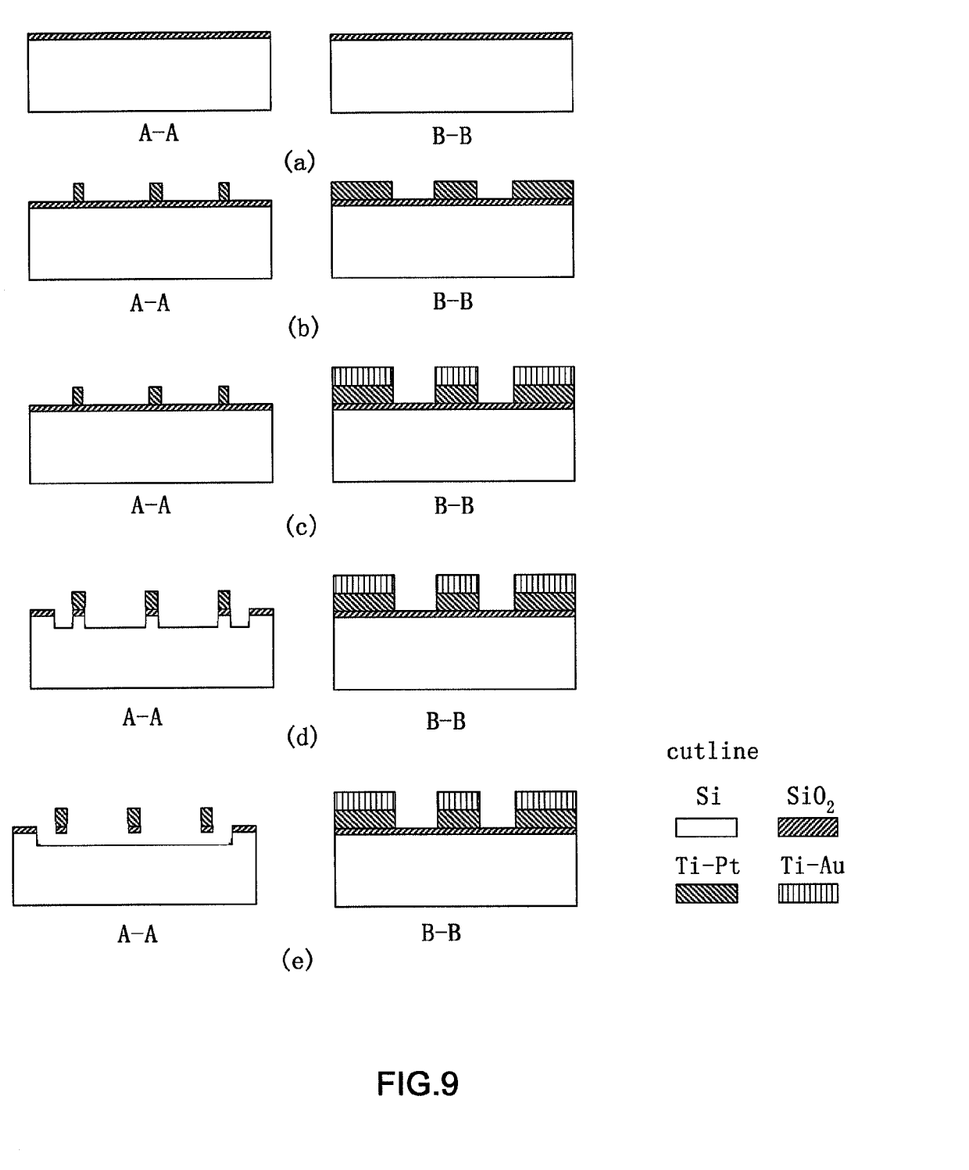
FIG. 9 is a sectional view of part positions of the chip during the chip arm manufacturing of the micromachined gas pendulum style level posture sensor.

The cross sections at (A-A) and (B-B) are formed, as shown in FIG. 9(b). Plating Ti serves to be a base and to enhance the combination of Pt and SiO₂.

Figure 8B:
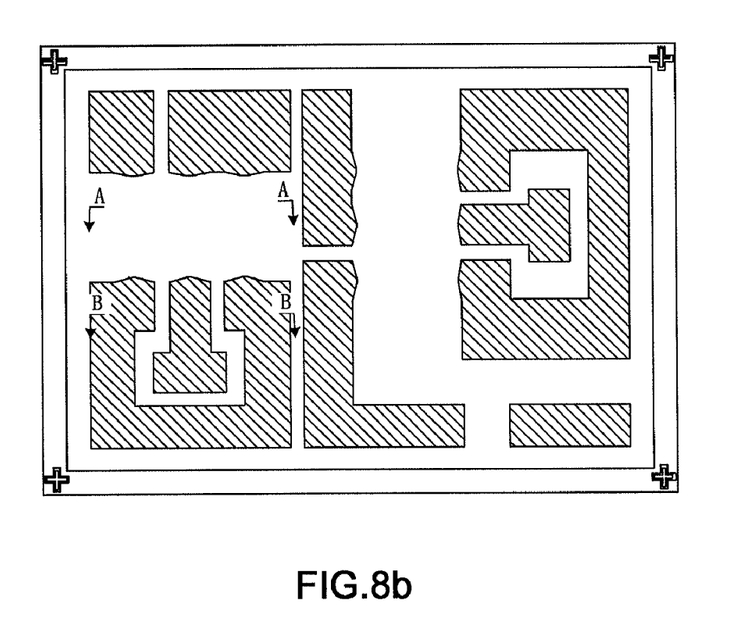
FIG. 8b is an illustrative diagram of a mask board used for second photo etching.

At steps 707 and 709, the surface of the silicon wafer is subject to the second photo etch by using a second mask board shown in FIG. 8b, and electrodes composed of Ti and Au and corresponding to the thermosensitive fuses and the heating fuse are formed on the pattern of the surface of the silicon wafer by sputtering. The material for sputtering also can be other metal such as copper, aluminum, silver, or other alloy material. After plating Ti and Au, the cross sections of the surface of the silicon wafer at (A-A) and (B-B) are shown in FIG. 9(c).

Figure 8C:
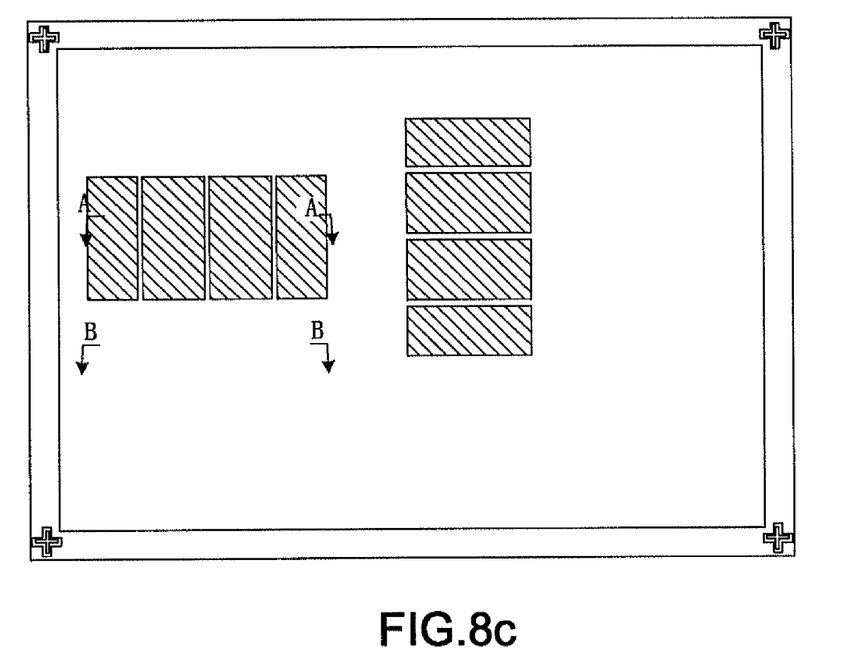
FIG. 8c is an illustrative diagram of a mask board used for third photo etching.

At step 711, the surface of the silicon wafer is subject to the third photo etch by using a third mask board, and a corresponding pattern is formed on the surface of the silicon wafer. The mask board used is shown in FIG. 8c.

At step 713, the dry method depth etching is made. The etching depth can be 100-140 μm. The situations of the corresponding surface of the silicon wafer after the dry method depth etching are shown in FIG. 9(d). Making the depth etching establishes a foundation for later arm processing.

At step 715, an arm structure is formed by wet method etching. The obtained corresponding arm situations are shown in the (A-A) cross sections of FIG. 9(d).

Proper feeding speed, dicing width and water flow speed are selected, and the silicon wafer is cut into small chips. The semiconductor chip may be sliced according to conditions after forming arm structures. And it is also possible to slice the semiconductor chip before step 715 in order to improve the rate of finished products.

Figure 10:
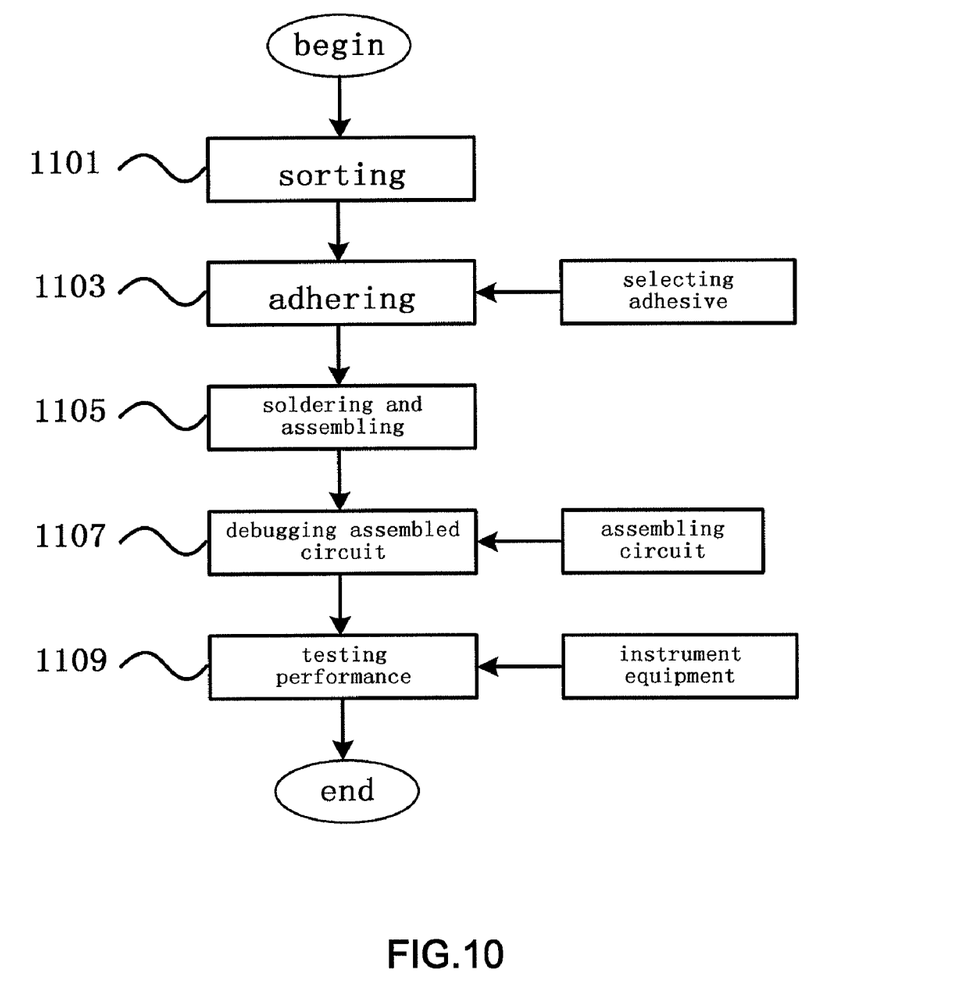
FIG. 10 is a flowchart of package testing for the micromachined gas pendulum style level posture sensing element.

FIG. 10 is a flowchart of encapsulation testing for the level posture sensing chip after finishing slicing.

As shown in FIG. 10, at step 1101, chip for which slicing is finished is sorted.

At step 1103, adhesive is selected, and the chip is adhered to the casing.

At step 1105, electrodes and wires are connected, and soldering and assembling are made.

At step 1107, the packaged chip is connected to a back end circuit, and the assembled circuit is debugged.

At step 1109, the packaged sensing element is tested in performance by using instrument equipments.

Figure 11:
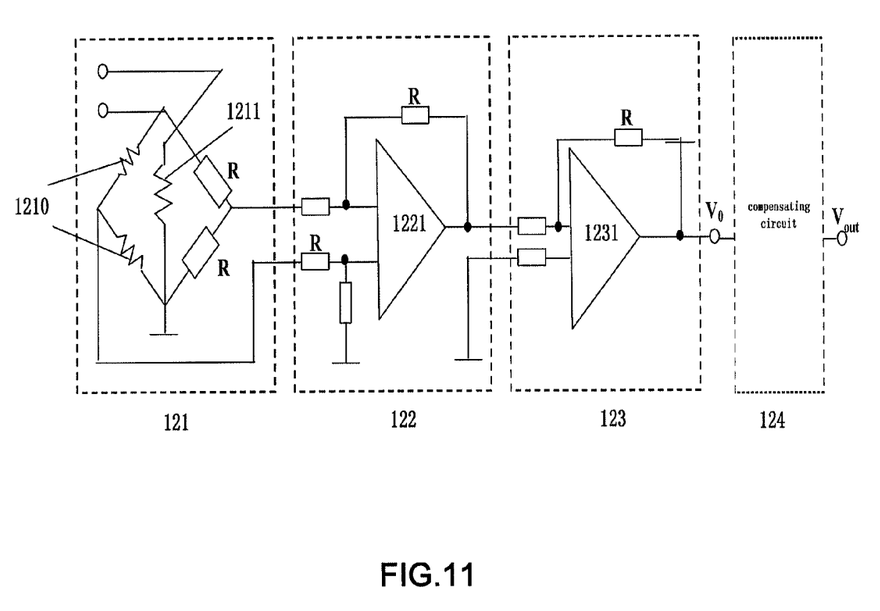
FIG. 11 is a structural illustrative diagram of a signal obtaining circuit of the micromachined gas pendulum style level posture sensor.

FIG. 11 is a circuit diagram of a signal obtaining circuit of the level posture sensor according to the present invention. As shown in FIG. 11, the signal obtaining circuit includes a tilt sensor 121, a first level amplifier 122, a second level amplifier 123 and a compensating circuit 124. In FIG. 1, the tilt sensor 121 includes a resistor 1210 composed of thermosensitive fuses and a resistor 1211 composed of a heating fuse. The resistor 1210 composed of thermosensitive fuses and two outer reference resistors R constructs a bridge, and when the sensor tilts respective to the level plane, two thermosensitive fuses in the bridge sense different temperatures with the result that the bridge is out of balance, outputting a voltage signal corresponding to the level posture tilt. The first level amplifier 122 and the second level amplifier 123 includes operational amplifiers 1221 and 1231 respectively, and amplifies the voltage signal output by the tilt sensor 121 to adjust to a defined $V_0$ for compensation. The final output is the voltage $V_{out}$ representing the tilt θ.

Figure 12:
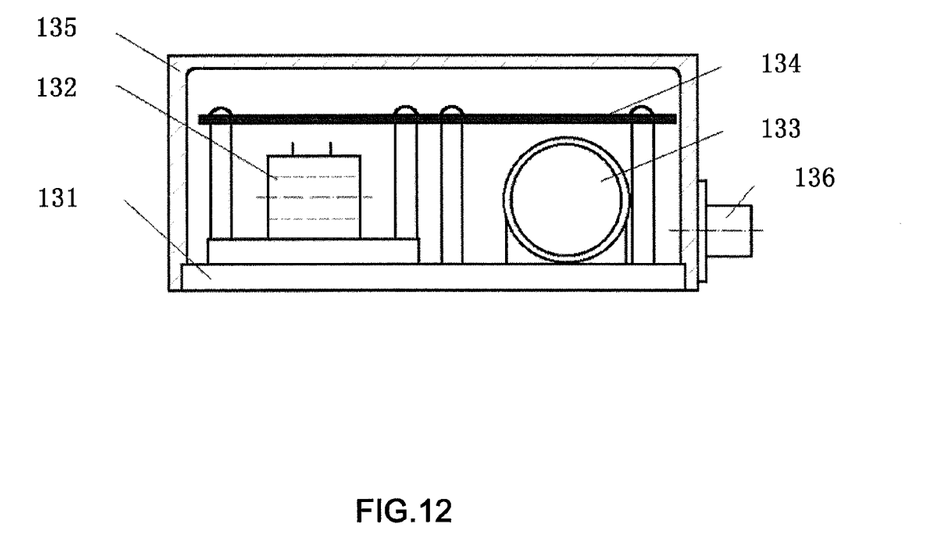
FIG. 12 is a structural illustrative diagram of the micromachined gas pendulum style level posture sensor.

FIG. 12 is a structural illustrative diagram of an embodiment the micromachined gas pendulum style level posture sensor according to the present invention. As shown in FIG. 12, the sensor includes a base 131, a level posture sensing element 132, an angular velocity gyroscope 133, a signal processing circuit 134, a casing 135 and a socket 136. In FIG.

12, the level posture sensing element 132 is configured by packaging the level posture sensing chip of the present invention. The level posture sensing element 132 is used to output a tilt voltage to the signal processing circuit 134. The angular velocity gyroscope 133 is used to output an angular velocity voltage to the signal processing circuit 134. The signal processing circuit 134 processes the received tilt voltage and the angular velocity voltage, and can obtain two dimension and omniberaing level posture output voltages after signal processing and output an interference-eliminated tilt voltage and an angular velocity voltage. Thus, the micromachined level posture sensor and the micromachined angular velocity gyroscope are combined to eliminate the interference of the moving base by the gyroscope so as to obtain the level posture output after eliminating the interference of the moving base.

Figure 13:
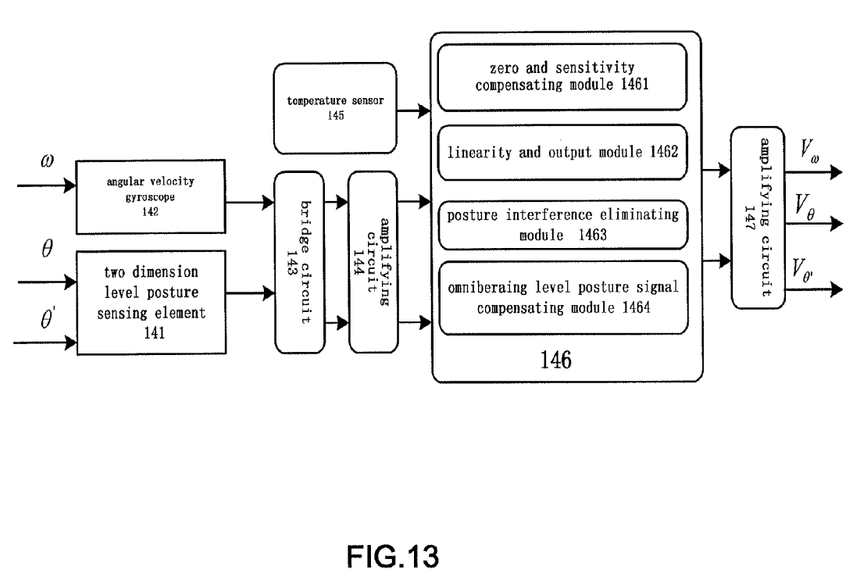
FIG. 13 is a schematic diagram of a signal processing circuit of the micromachined gas pendulum style level posture sensor.

FIG. 13 is a schematic diagram of the principle a signal processing circuit of the micromachined gas pendulum style level posture sensor according to the present invention. As shown in FIG. 13, the circuit includes a two dimension level posture sensing element 141, an angular velocity gyroscope 142, a bridge circuit 143, an amplifying circuit 144, a temperature sensor 145, a singlechip 146 and an amplifying circuit 147. The angular velocity gyroscope 142 detects the angular velocity ω and sends it to the bridge circuit 143, the two dimension level posture sensing element 141 detects a tilt θ and an interference angle θ' and sends them to the bridge circuit 143, the bridge circuit 143 converts the received signals to electrical signals and sends them to the amplifying circuit 144 for amplifying and forwarding to the singlechip for process. The temperature sensor 145 sends the detected temperature signal to the singlechip for processing. The singlechip processes the received signals and then sends them to the amplifying circuit 147, and an angular velocity voltage signal $V_\omega$ and a tilt voltage signal $V_\theta$ are output by the amplifying circuit. The singlechip includes a zero and sensitivity compensating module 1461, a linearity and output module 1462, a posture interference eliminating module 1463 and an omniberaing level posture signal compensating module 1464.

For the level posture sensor, it can be referenced to the related description in Chinese Patent Publication No. CN101071066A. The main technical criteria of the micromachined gas pendulum style level posture sensor of the present invention is shown in Table 3 below:

TABLE 3

| Measurement range | Respond time | Resolution | Nonlinearity | Inhibiting interference efficiency |
|---|---|---|---|---|
| ±45° | ≦80 ms | ≦0.01° | ≦1% | ≧95% |

In the micromachined gas pendulum style level posture sensor provided by the present invention, the chip of the level posture sensor is manufactured by micromachined silicon processing technology, and the parallelism and verticality of the thermosensitive fuse is high in precision. The silicon processing technology for the micromachined gas pendulum style level posture sensor such as photo etching, depth etching, sputtering, etching and so on can accurately control the resistance of the thermosensitive fuse and manufacture chips with good performance uniformity. The chip size of the micromachined gas pendulum style level posture sensor can be small to be below 4×4 mm², and on a 4 inches chip, more than 100 chips can be manufactured with the result of the easy implementation of mass production.

The description of the present invention is provided for the purpose of illustration and description, rather than being exhaustive or limiting the present invention to the disclosed form. Many modifications and varieties are obvious to those ordinarily skilled in the art. Embodiments are selected and described to explain the theory and practical application of the present invention better, and to enable those ordinarily skilled in the art to understand the present invention so as to design various embodiments with various modifications appropriate for specific uses.

The invention claimed is:

1. A semiconductor chip manufacturing method, comprising the steps of:
   forming a mask layer on a surface of a semiconductor substrate;
   forming thermosensitive fuses and a heating fuse on the mask layer;
   forming electrodes at the ends of the thermosensitive fuses and the heating fuse; and
   forming an arm by etching the area of the semiconductor substrate where the thermosensitive fuses and the heating fuse are.

2. The semiconductor chip manufacturing method of claim 1, wherein the semiconductor substrate is a silicon wafer, and the mask layer is silicon dioxide or silicon nitride.

3. The semiconductor chip manufacturing method of claim 1, wherein the step of forming the thermosensitive fuses and the heating fuse on the mask layer including:
   forming a first pattern on the mask layer by photo etching; and
   forming the thermosensitive fuses and the heating fuse composed of metal or alloy on the first pattern by sputtering or evaporating.

4. The semiconductor chip manufacturing method of claim 3, wherein the alloy is platinum lawrencium or nickel chromium aluminum.

5. The semiconductor chip manufacturing method of claim 1, wherein the step of forming electrodes at the ends of the thermosensitive fuses and the heating fuse includes:
   forming a second pattern on the surface of the semiconductor by photo etching; and
   forming the electrodes on the second pattern by evaporating, said electrodes being disposed at the ends of the thermosensitive fuses and the heating fuse.

6. The semiconductor chip manufacturing method of claim 1, wherein the step of forming the arm includes:
   forming a third pattern around the thermosensitive fuses and the heating fuse on the surface of the semiconductor by photo etching;
   forming thermosensitive fuse cylinders and heating fuse cylinder by dry method etching; and
   forming arm thermosensitive fuses and an arm heating fuse by wet method etching.

7. The semiconductor chip manufacturing method of claim 1, further comprising the step of heat-processing the semiconductor chip under the temperature of 300-800° C.

* * * * *